United States Patent Office 3,356,615
Patented Dec. 5, 1967

3,356,615
PREPARATION OF A THORIA SOL BY HEATING AN AQUEOUS SOLUTION OF A THORIUM SALT IN AN AUTOCLAVE
Frederick T. Fitch and Jean G. Smith, Baltimore, Md., assignors to W. R. Grace & Co., New York, N.Y., a corporation of Connecticut
No Drawing. Filed Nov. 2, 1964, Ser. No. 408,326
6 Claims. (Cl. 252—301.1)

This invention relates to the preparation of colloidal dispersions of metal oxides. In one particular aspect, it relates to a method for preparing stable thoria sols by hydrothermal treatment.

Thoria sols are useful as nuclear fuels. Either alone or combined with urania, their free-flowing, non-settling characteristics make them attractive for the homogeneous breeder-type reactor. Silica cladding of the sols can be used, if desired, to impart great hydrothermal stability. These sols may also be used advantageously in making ceramic fuel elements. The sol particles yield elements of greater strength at lower sintering temperatures than do conventional thoria powders. The sols also provide a means for dispersing thoria uniformly throughout a matrix. For example, thoria sol may be stirred into graphite powder after which the mixture is poured into a mold, dried and fired.

It has recently been disclosed that sols of metal oxides, including thoria, when incorporated in certain metals and their alloys, have the ability to greatly improve their high temperature characteristics. The metal oxide sols are incorporated into the metal by mixing a solution of a salt of the metal with the sol. This mixture is then reduced with hydrogen so that the free metal with the sol particles dispersed in it is obtained in powdered form. The powder is then useful for making metal objects by conventional powder metallurgy techniques. Metals treated in this manner have been found especially useful for making objects which are under heavy stress at high temperatures.

The thoria sols prepared according to the method of this invention are particularly well suited for these applications.

We have discovered a method whereby thoria sols containing dense, spherical particles in the size range of 10 to 650 millimicrons can be prepared by hydrothermal treatment. Broadly speaking, the process consists of preparing an aqueous solution of a soluble thorium salt in an appropriate concentration followed by heating in an autoclave for a specified time. A thoria sol containing dense, spherical particles is recovered as product. The product is then further treated to remove electrolytes, after which it can be concentrated to the desired level.

The characteristics of the product sol prepared by our method are determined by a number of variables. By the proper control of these variables, a product with predetermined properties can be prepared.

The first of these variables to be considered is the starting material. Our process is operable using either a soluble thorium salt of a monovalent acid or a soluble basic thorium salt of a monovalent acid. If the concentration of the thorium salt solution is to be less than 2 g. $ThO_2$/100 ml., the salt of a monovalent acid can be used. Any of the soluble salts such as the nitrate, chloride or formate are suitable. For convenience, we have used thorium nitrate and thorium chloride.

If the concentration level of the starting material is greater than 2 g. $ThO_2$/100 ml., a soluble basic salt of a monovalent acid must be used. Basic salts may be prepared in any convenient manner. Suitable methods include:

(1) Treating a soluble salt with an anion exchange resin in the hydroxyl form;
(2) Partially neutralizing $Th(OH)_4$ with a monovalent acid;
(3) Treating the neutral salt with a base.

Any soluble basic salt can be used. We have found the most convenient to be the oxychloride and the oxynitrate.

A thoria sol can be obtained by autoclaving any basic thorium salt within the limit of its solubility. At concentration levels greater than 5 g. $ThO_2$/100 ml., however, there is a tendency for sol particles to associate. This is probably due to the higher concentration of electrolytes in the surrounding liquor. It is preferred, then, to prepare sols at levels of 5 g. $ThO_2$/100 ml. or less and then, if desired, concentrate the product.

The colloidal particles obtained when the basic salts are used at concentrations greater than 2 g. $ThO_2$/100 ml. are spherical aggregates 10–75 m$\mu$ in diameter composed of sub-units which are open-centered cubes averaging 7 m$\mu$ across. Occasionally the sub-units are rods 3–4 m$\mu$ in length. The size and density of the aggregate depends on the method used in preparing the starting solution and on the conditions of autoclaving. The largest and most dense spherical aggregates are obtained by using starting solutions in which part of the anions have been replaced by hydroxyl ions through ion exchange.

Another variable upon which particle characteristics depend is the time and temperature of autoclaving. Temperatures between 100 and 200° C. and a time of about 1 to 40 hours can be used. The preferred range is about 120 to 150° C. for about 8 to 20 hours. Eight hours autoclaving at 120° C. is sufficient time. Less severe autoclaving conditions fail to complete particle formation while more severe conditions cause gradual deterioration of the sol particles.

Particle characteristics also vary with the $ThO_2$/anion ratio. With the basic chloride at the 5 g. $ThO_2$/100 ml. concentration level, a sol can be obtained when the ratio is between 0.25 and 1. A ratio of 0.5 is preferred, however, to yield dense, aggregate particles. At $ThO_2$/Cl ratios approaching 1, fine-sized sols consisting of uniformly dispersed sub-units are obtained upon autoclaving. These ratios vary slightly for other anions.

After the sol has been formed, it must be further treated to remove electrolytes and to concentrate it, if desired. The sol is most conveniently concentrated where the colloidal phase is flocculated during autoclaving. In this case, the bulk of the electrolytes can be removed by simply decanting the supernatant liquids. Sols which do not flocculate during preparation are centrifuged to bring down the dispersed phase, followed by decantation to remove the electrolytes. The solids remaining after decantation are redispersed in deionized water to give the desired sol concentration. Concentrations up to about 50% $ThO_2$ can be obtained via this redispersion route.

As an alternate procedure, the sol may be purified by passing through a commercially available anion exchange resin such as Amberlite IR–45, for example, in the hydroxyl form and then concentrated by evaporation.

The specific conductance of the sols is measured at 25° C. with a standard conductivity bridge and a cell containing platinized platinum electrodes.

The specific conductance L of the sol in question can be determined by measuring its resistance and using the equation:

$$L_{sol} = \frac{K}{R}$$

where $K$ = cell constant
$R$ = resistance in ohms.

The particle characteristics of our sols were determined by electron microscopy. Standard techniques were used in preparing the micrographs.

Our invention will be further explained by the following specific but non-limiting examples.

EXAMPLE I

This example describes the preparation of a sol using a low concentration of thoria in the starting material.

A thorium chloride solution was prepared by heating thoria hydrate with concentrated hydrochloric acid, evaporating to dryness to remove excess HCl and dissolving the resulting crystals in deionized water to a concentration level of 1.25 g. of equivalent $ThO_2$/100 ml. A 120 ml. volume of this solution was heated in an autoclave for 22 hours at 150° C. in a glass pressure vessel without mechanical stirring. The product was obtained as a white floc which was easily separated from the supernatant liquid by decantation. The pH and the conductivity of the solution were measured both before and after autoclaving. The effect of autoclaving on these properties is shown below:

|  | Before Autoclaving | After Autoclaving |
| --- | --- | --- |
| pH | 2.91 | 1.30 |
| Specific conductance (mho/cm.) | $1.4 \times 10^{-2}$ | $3.1 \times 10^{-2}$ |

Electrolyte concentration in the product was reduced by dispersing the floc in 120 ml. of deionized water. The dispersion was allowed to stand for several days during which the dispersed phase settled due to its large particle size. The sol was concentrated by decanting the clear supernatant and shaking the residue with a minimum amount of deionized water. The final sol was a very opaque white and scattered light strongly.

Electron micrographs showed the product sol to consist primarily of dense balls having diameters of 300–500 millimicrons. Other properties of the product are set out below:

pH _____ 2.62
Specific conductance (mho/cm.) _____ $1.3 \times 10^{-3}$
Density (g./cc.) _____ 1.328
Concentration (wt. percent $ThO_2$) _____ 25.1

EXAMPLE II

In this run, thorium nitrate was used as the starting material.

A solution containing the equivalent of 1 g. $ThO_2$/100 ml. was prepared by dissolving crystals of thorium nitrate in deionized water. A 120 ml. volume of the solution was placed in a glass pressure bottle and heated in an autoclave for 20 hours at 150° C. without stirring. The effect of autoclaving on the pH and specific conductivity was as follows:

|  | Before Autoclaving | After Autoclaving |
| --- | --- | --- |
| pH | 2.65 | 1.22 |
| Specific conductance (mho/cm.) | $1.2 \times 10^{-2}$ | $2.9 \times 10^{-2}$ |

After removing from the autoclave, the sol was concentrated by centrifuging for 20 minutes at 10,000 r.p.m., decanting the supernatant liquid, and finally redispersing the solids in a minimum amount of deionized water. Residual electrolyte content was reduced by passing the redispersed sol through a freshly regenerated commercially available anion exchange resin (IR-45 produced by Rohm & Haas Co., Philadelphia, Pa.) in the hydroxyl form.

The product was a translucent sol which was shown by electron microscopy to be a dispersion of dense, spherical aggregates having diameters of about 25 millimicrons. The aggregates were formed by tight packing of 7 millimicron open-centered cubic sub-units.

The properties of the sol following deionization were as follows:

pH _____ 1.45
Density (g./cc.) _____ 1.38
Concentration (wt. percent $ThO_2$) _____ 27.7

EXAMPLE III

A sol was prepared in this run from a basic thorium salt.

A basic thorium chloride solution was obtained by passing a solution of thorium chloride containing the equivalent of 6.25 g. $ThO_2$/100 ml. through an anion exchange column packed with Amberlite IR-45 resin in the hydroxyl form.

A 120 ml. quantity of the resulting basic chloride solution was placed in a glass pressure bottle and heated in an autoclave for 20 hours at 120° C. Changes during autoclaving were as follows:

|  | Before Autoclaving | After Autoclaving |
| --- | --- | --- |
| pH | 3.28 | 2.22 |
| Specific conductance (mho/cm.) | $2.2 \times 10^{-2}$ | $2.6 \times 10^{-2}$ |

Electron microscopy showed the product sol to consist of dense, spherical aggregates of 7 mμ cubic sub-units. The aggregates ranged in size from 10 to 45 millimicrons with a mean diameter of 35 mμ.

The sol was concentrated by centrifuging for 20 minutes, decanting the supernatant and finally redispersing the residue in a minimum volume of deionized water. Properties of the final product were as follows:

pH _____ 2.64
specific conductance (mho/cm.) _____ $1.2 \times 10^{-2}$
Density (g./cc.) _____ 1.63
Concentration (wt. percent $ThO_2$) _____ 40.1

EXAMPLE IV

A basic thorium chloride solution containing 5 g. $ThO_2$/100 ml. was prepared by reacting freshly precipitated and washed thorium hydroxide with hydrochloric acid so that the final $ThO_2$/Cl ratio was 0.6. The thorium hydroxide was obtained by precipitating 120 ml. of thorium chloride solution containing the equivalent of 5 g. $ThO_2$/100 ml. with excess ammonia. The precipitate was washed with deionized water to remove chloride, then dissolved in 15.1 ml. of 3 N hydrochloric acid.

The basic chloride solution was diluted to 120 ml., placed in a glass pressure bottle, and heated in an autoclave for 20 hours at 150° C. The effect of autoclaving is shown as follows:

|  | Before Autoclaving | After Autoclaving |
| --- | --- | --- |
| pH | 3.37 | 1.33 |
| Specific Conductance (mho/cm.) | $2.0 \times 10^{-2}$ | $3.6 \times 10^{-2}$ |

A very opaque white sol was obtained as product. Electron microscopy showed the sol to be composed of low density spherical aggregates of 7 mμ cubic sub-units. Aggregate size ranged downward from 35 mμ. The aggregates were strongly associated with one another and a strong Tyndall effect was observed.

The sol was to stand for several days during which the dispersed phase settled. The electrolytes were removed by decanting the supernatant liquid. The solids were redispersed in a minimum amount of water and then final sol properties measured as follows:

pH _____ 2.71
Specific conductance (mho/cm.) _____ $8.5 \times 10^{-4}$
Concentration (wt. percent $ThO_2$) _____ 5.2

EXAMPLE V

A fine-sized thoria sol was obtained in this run by using as starting material a basic chloride solution in which the $ThO_2/Cl$-ratio was 0.9.

The basic chloride solution was prepared by treating freshly precipitated and washed thorium hydroxide (obtained as described in Example IV) with 8.4 ml. of 3 N hydrochloric acid. This solution was diluted to 120 ml. with deionized water and contained the equivalent of 5 g. $ThO_2/100$ ml. The solution was placed in a glass pressure bottle and heated in an autoclave for 20 hours at 150° C. The changes in properties during autoclaving were as follows:

|  | Before Autoclaving | After Autoclaving |
|---|---|---|
| pH | 3.53 | 1.48 |
| Specific Conductance (mho/cm.) | $1.2 \times 10^{-3}$ | $2.7 \times 10^{-2}$ |

The product sol was translucent and consisted of well dispersed open-centered cubic sub-units 7 to 9 millimicrons in size. There was no apparent tendency for the sub-units to aggregate.

What is claimed is:

1. A process for preparing a stable thioria sol which comprises preparing an aqueous solution of a soluble thorium salt, heating the solution in an autoclave for a time and at a temperature sufficient to form a sol, removing the sol from the autoclave, reducing the electrolyte content, concentrating to the desired level and finally recovering the product sol.

2. A process for preparing a stable thoria sol having particles in the 10 to 650 millimicron size range which comprises preparing an aqueous solution of a soluble thorium salt, heating the solution in an autoclave for 2 30 hours at a temperature between 100° and 200° C., removing the sol from the autoclave, reducing the electrolyte content, concentrating to the desired level and finally recovering the product sol.

3. A process for preparing a stable thoria sol having particles in the size range of 10–650 millimicrons which comprises preparing an aqueous solution of a soluble thorium salt of a monovalent acid in a concentration of up to 2 g. $ThO_2/100$ ml., heating the solution in an autoclave at 120° to 150° C. for 8 to 20 hours, removing the sol from the autoclave, reducing the electrolyte content by first centrifuging to bring down the dispersed phase followed by decantation of the supernatant liquid, redispersing the solids in deionized water to give the desired concentration and finally, recovering the product sol.

4. A process for preparing a stable thoria sol having particles in the size range of 10 to 650 millimicrons which comprises preparing an aqueous solution of a soluble thorium salt, heating in an autoclave for 8 to 20 hours at a temperature between 120° and 150° C., removing the sol from the autoclave, reducing the electrolyte concentration by decantation, redispersing the thoria particles in deionized water to give the desired concentration and finally recovering the product sol.

5. A process for preparing a stable thoria sol having particles in the size range of 10 to 650 millimicrons which comprises preparing an aqueous solution of a soluble thorium salt, heating in an autoclave for 8 to 20 hours at a temperature between 120 and 150° C., removing the sol from the autoclave, reducing the electrolyte content by passing the sol through an anion exchange resin in the hydroxyl form, concentrating the sol to the desired level by evaporation and finally, recovering the product sol.

6. A process according to claim 3 in which the soluble thorium salt is selected from the group consisting of thorium chloride and thorium nitrate.

References Cited

UNITED STATES PATENTS

| | | | |
|---|---|---|---|
| 3,097,175 | 7/1963 | Barrett et al. | 252—301.1 |
| 3,151,085 | 9/1964 | Smith et al. | 252—301.1 |
| 3,151,086 | 9/1964 | Vanik et al. | 252—301.1 |
| 3,164,554 | 1/1965 | Barrett et al. | 252—301.1 |
| 2,984,628 | 5/1961 | Alexander et al. | |
| 3,281,373 | 10/1966 | Smith et al. | 252—301.1 |

FOREIGN PATENTS

| | | |
|---|---|---|
| 399,133 | 8/1932 | Great Britain. |
| 884,975 | 12/1961 | Great Britain. |

CARL D. QUARFORTH, *Primary Examiner.*

BENJAMIN R. PADGETT, L. DEWAYNE RUTLEDGE, *Examiners.*

S. J. LECHERT, JR., *Assistant Examiner.*